2,781,325

PRECIPITATED IRON CATALYSTS FOR CARBON MONOXIDE HYDROGENATION

Walter Rottig, Oberhausen-Sterkrade-Nord, Germany, assignor to Ruhrchemie Aktiengesellschaft, Oberhausen-Holten, and Lurgi Gesellschaft fuer Waermetechnik m. b. H., Frankfurt am Main-Heddernheim, Germany, a German corporation No Drawing. Application January 3, 1952,
Serial No. 264,851

Claims priority, application Germany January 8, 1951

7 Claims. (Cl. 252—472)

This invention relates to improvements in precipitated iron catalysts for carbon monoxide hydrogenation. It more particularly relates to a method for increasing the grain strength of iron-containing precipitated catalysts which are to be used for carbon monoxide hydrogenation.

As is known, various different iron catalysts may be used for the catalytic hydrogenation of carbon monoxide. These catalysts include melted catalysts, sintered catalysts and precipitated catalysts. The melted catalysts are prepared by oxidizing and melting iron powder, disintegrating the melted cake formed into catalyst grains and reducing these grains in a stream of hydrogen. If desired prior to the reduction, the catalyst grains may be impregnated with alkaline. For the preparation of sintered catalysts iron powder which may, if necessary and desired, be alkali impregnated, is sintered. The sintered mass is then disintegrated into catalyst grains which are reduced in a hydrogen stream.

Precipitated iron catalysts for use in the catalytic hydrogenation of carbon monoxide are prepared from water-soluble iron salts and principally iron nitrates. The use of iron sulfate, iron chloride and iron salts of organic acids or mixtures thereof have also been suggested for this purpose. The iron salts are dissolved in an aqueous solution which is then precipitated with the use of alkaline-reacting compounds. The precipitation may be effected if desired or necessary in the presence of activators such as, for example, copper, silver, calcium, barium, titanium, chromium, and the like. Alkali hydroxides, alkali carbonates, ammonia and compounds of ammonia have been used to effect the precipitation. The moist catalyst cake obtained as the precipitate, is generally subjected to a suction filtration, washed and, if necessary or desired, impregnated with alkali. After the washing or alkali impregnation, as the case may be, the catalyst in most cases is molded for the purpose of obtaining a grain having a maximum resistance to abrasion. This molded grain is then dried at a temperature of approximately 100° C.

Prior to use in the hydrogenation process, these molded catalysts are reduced with reducing gases at temperatures between 100° and 350° C. using various flow rates.

The precipitated iron catalysts formed in this manner have an excellent activity as compared to sintered catalysts. Despite this excellent activity, however, these precipitated iron catalysts have the marked disadvantage of often splintering and forming catalyst dust during the reduction. This is true in spite of the previous molding. Removal of these undesirable splintered grains and catalyst dust after reduction is very difficult, since the reduced catalyst grains are very reactive to air. When effecting reduction or pretreatment of the catalyst in the synthesis furnace itself, this splinter or dust formation is particularly undesirable. The catalyst dust or splintered grains may form obstructions during the charging under certain circumstances. This may cause difficulties, not only in the synthesis itself, but mainly in the subsequent discharging of the synthesis furnace.

One object of this invention is the production of a precipitated iron catalyst for carbon monoxide hydrogenation which will have increased grain strength and which will not splinter or form catalyst dust in the above-described manner. This, and still further objects will become apparent from the following description:

It has now been found that in accordance with the invention that the grain strength of iron-containing precipitated catalysts for use in the hydrogenation of carbon monoxide may be materially increased by the addition of iron powders to the catalysts after the precipitation. The iron powders which may be used in accordance with the invention, may be any known iron powders prepared mechanically, chemically or physically.

The particle size of the powders which may be used in accordance with the invention is similar to those used for numerous metallurgical purposes, and should be from 10 to 250 $\mu$, and preferably between 40 and 80 $\mu$. It is very desirable in accordance with the invention that the powders have as irregular a structure as is possible as viewed under the microscope, since, considerable additional grain strength is gained thereby.

The iron powders used in accordance with the invention may be in pure form, though it is also possible to use iron powders which contain such activators as chromium, manganese, titanium, tungsten, alkalis or alkaline earths.

The preparation of the precipated iron catalysts in accordance with the invention is effected in the usual manner. It is, however, desirable that an amount of the iron salt is left out of the starting material which corresponds to the quantity which is to be added as iron powder. The precipitation is then effected in the usual manner from the known iron salts, as, for example, at a temperature between 50° and 100° C., using hot solutions of alkali hydroxide or carbonate. Immediately upon the precipitation, the iron powder is stirred into the precipitated catalyst mass with intensive stirring to insure as uniform as possible a distribution of the iron powder into the precipitated cake. The quantity of iron powder used may be as much as 75% by weight of the total iron in the catalyst. The best effects, however, in accordance with the invention, are obtained by using approximately 25% to 50% by weight of the iron powder calculated on the total weight of iron present in the catalyst. Almost no specific effect is obtained by adding less than 10% of iron powder.

The addition of the iron powder may be carried out not only directly after the precipitation but also prior to or during the precipitation. When the addition shall be carried out prior to the precipitation, the iron powder is suspended in the solution used for the precipitation, such as, for example, in the hot alkali carbonate solution, followed by adding the hot nitrate solution. When adding the iron powder after the precipitation, the addition should be effected as quickly as possible since a longer stirring time prior to the addition of the iron powder is deleterious to the activity of the catalyst. The period of time between the completion of the precipitation and the addition of the iron powder should be not longer than 5 minutes.

After the precipitation and the addition of the iron powder the catalyst mass is processed in the usual manner. It is washed several times followed by, if necessary or desired, an impregnation corresponding to the intended composition of the catalyst. Depending on the purpose for which the catalyst is intended, a partial washing may be of advantage. After the washing and/or impregnation, the catalyst is molded. It has been found, however, in accordance with the invention, that even by simple drying a so-called lump catalyst is obtained, the grain strength of which, especially upon reduction, is considerably superior to that of precipitated catalysts prepared without admixture of iron powder.

The method in accordance with the invention is suited for the preparation of catalysts for use in carbon monoxide hydrogenation with the preferred formation of hydrocarbons as well as for the production of synthesis products containing a preferred content of oxygen-containing compounds, such as alcohols and esters. When producing catalysts in accordance with the invention for use in synthesis with the preferred formation of hydrocarbons, these catalysts may either be formed for the preferred formation of higher molecular hydrocarbons or lower molecular hydrocarbons.

The catalysts prepared in accordance with the invention may also be used with particular advantage for the synthesis of the type carried out with the addition of gaseous ammonia or organic amines to the synthesis gas. (See patent application No. 158,935). The precipitation may be effected in the presence of activators such as, for example, copper, silver, calcium, barium, titanium, chromium and the like. These activators are applied in conventional amounts.

The reduction or pretreatment of the catalysts prepared in accordance of the invention is carried out in the known and conventional manner, using reducing gases, such as hydrogen, carbon monoxide or mixtures thereof. The reduction temperatures used should be between 100° and 400° C., and preferably between 200 and 350° C. The use of high gas velocities for the reduction, as, for example, gas velocities of 50 to 150 meters per second, is advantageous, mainly because the reduction may be carried out in layer depths of 1 meter and more.

The catalysts may be used in connection with carbon monoxide hydrogen synthesis at atmospheric pressure. It is, however, preferable that these catalysts are used in connection with the synthesis which is effected at elevated pressures, as, for example, pressures between 5 and 100 atmospheres, and preferably between 5 and 40 atmospheres. The synthesis gas loads used may be varied within wide limits, depending upon the purpose and object of the synthesis. It is thus possible to use gas loads between 10 and 1000 volumes of gas per volume of catalyst per hour. It is particularly advantageous if the gas loads of 100 to 500 volumes of gas per volume of catalyst per hour are used. The synthesis with the use of the catalyst in accordance with the invention may be carried out with both straight passage of the synthesis gas and a recycling of the synthesis gas with a recycle ratio of recycled gas to synthesis gas of 0.5–10:1, and preferably a recycle ratio of 1–4:1.

The synthesis with the new catalyst in accordance with the invention may be effected in one or several stages with a carbon dioxide scrubbing carried out after the individual synthesis stages. Both gases rich in hydrogen and gases rich in carbon monoxide may be used as reaction gases. A carbon monoxide to hydrogen ratio of approximately 1:1 to 1:2 is advantageously used.

The precipitated iron catalyst produced in accordance with the invention may also be used in any other known synthesis process and in any known manner in which precipitated iron catalysts are used.

The following examples are intended to further illustrate the invention and not to limit the same:

*Example 1*

Iron nitrate was dissolved in water and precipitated with an aqueous solution at boiling temperature in such a manner that the pH value after the precipitation was 7. Immediately thereafter the same quantity of iron powder calculated on the total amount of iron present was added with vigorously stirring, using a turbo stirrer. The particle size of the iron powder used, which is known under the name "Hametag iron powder" was 20–60 $\mu$. The catalyst mass was filtered and largely freed from precipitation alkali by repeated washings with hot condensate. After this an impregnation with potassium water glass was carried out in such a way that, calculated on total iron, 3% of $K_2O$ and 7.6% of $SiO_2$ were contained in the catalyst. Then the catalyst mass was dried at 105° C. for twenty-four hours. After crushing and sieving to a grain size between 2 and 4 mm., the catalyst was used to charge a synthesis furnace and reduced therein for four hours at increasing temperatures between 200 and 230° C. using water gas at flow rates of 1.2 meters per second. Thereafter the catalyst was used for synthesis at a synthesis pressure of 20 atm. and a temperature of 246° C., using a gas load of 100 litres per hour of gas per litre of catalyst. The conversion obtained was 68% $CO+H_2$, while 6% by volume of methane calculated on $CO+H_2$ converted were formed.

Upon completion of this experiment the same catalyst was used in a synthesis, using twice the water gas load and a temperature of 264° C. A conversion of 65% $CO+H_2$ was obtained with methane formation at 7%.

When operating the process with gas recycling the same conversion was obtained as in the first case at a temperature which was approximately 10° C. lower, with methane formation reduced to approximately 4.5%. In the second case, with gas recycling (ratio of synthesis gas to recycled gas approximately 1:3), the same conversion was obtained at a temperature which was 12° C. lower, with a methane formation of approximately 6%.

*Example 2*

The same catalyst as prepared in Example 1 was reduced in a special reduction apparatus rather than in the furnace. The reduction was carried out at 280° C., using a hydrogen nitrogen mixture at a linear gas velocity of 1.2 metres per second. Using water gas at a synthesis pressure of 20 atmospheres, a gas load of 100 litres of gas per litre of catalyst per hour and a temperature of 248° C., a $CO+H_2$ conversion of 64% was obtained with a methane formation of approximately 7%.

*Example 3*

100 parts of iron and 20 parts of copper were precipitated in the form of their nitrates from a boiling aqueous solution using a boiling soda solution. The pH of the solution was 9.1. Immediately thereafter 100 parts of iron powder of a particle size of 40–60 $\mu$ were added, while vigorously stirring. The mixture was filtered in the hot state. The precipitated catalyst mass was carefully washed with hot condensate, followed by an impregnation with $K_2CO_3$ in such a manner that 10 parts calculated as $K_2O$ per 100 parts of total iron were present. The catalyst mass was molded in an extruding press to thread-like grains of 3.5 mm. diameter and subsequently dried for twenty-four hours at 110° C. In a reduction apparatus the catalyst was reduced for one hour at 300° C., using a hydrogen nitrogen mixture at a linear gas velocity of 1.3 meters per second. Thereafter 72% of the iron content was present in the metallic form. A synthesis furnace was charged with this catalyst and operated with water gas at a synthesis pressure of 30 atmospheres and a gas load of 1:100. At a reaction temperature of 195° C. a $CO+H_2$ conversion of 62% was obtained with a methane formation of 7%. The resulting reaction product contained approximately 27% of alcohols and approximately 3% of aldehydes in addition to approximately 20% of esters.

Upon termination of this experiment, the same catalyst was charged with twice the quantity of water gas at a synthesis temperature of 215° C. 57% of $CO+H_2$ were converted. Approximately 25% of alcohols and approximately 3% of aldehydes in addition to 23% of esters were contained in the reaction product.

*Example 4*

A boiling solution containing 40 gms. of iron, 2 gms. of copper and 4 gms. of lime in the form of their nitrates was rapidly added to a boiling soda solution containing 92 gms. per litre of anhydrous soda. Upon termination of the precipitation, the pH value was 7.1. Immediately following this, a technical-grade iron powder of a particle size between 20 and 60 $\mu$ was stirred in in such a quantity that 40% of iron was present in the form of iron powder calculated on the total iron now present. The catalyst slurry was washed with hot condensate until the residual content of alkali was approximately 0.5%, reckoned as $K_2O$ and calculated on total iron present.

10 kilos of this catalyst mass having an Fe content of approximately 25% were stirred by means of a turbo stirrer with 10 litres of condensate of a temperature of about 50° C. resulting in a homogeneous suspension. To this quantity technical-grade potassium water glass containing about 8% of $K_2O$ and about 20 percent of $SiO_2$ were added in such a quantity that 25 parts by weight of silicic acid per 100 parts by weight of iron were present. Following this, the pH was adjusted to 7.1 by means of nitric acid of a concentration of about 50 percent, whereupon the catalyst was filtered after heating to 80° C. After a short intermediate drying, the catalyst was molded to filaments by means of an extruding press followed by final drying for twenty-four hours at 105° C.

The reduction was carried out for 90 minutes at a linear gas velocity of 1.5 meters per second and a temperature of 310° C.

Using a gas load of 200 litres of water gas per litre of catalyst per hour, a synthesis pressure of 30 atmospheres and a temperature of 265° C., a $CO+H_2$ conversion of 63% was obtained. Methane formation was approximately 5%.

I claim:

1. In the method for the production of carrier-free unsintered precipitated iron catalysts for use in carbon monoxide hydrogenation by precipitation of an aqueous iron salt solution with an alkaline reacting compound, the improvement for increasing the catalyst grain strength which comprises mechanically mixing iron powder having a grain size of about 10–250 $\mu$ with the wet catalyst precipitate to form a substantially uniform mixture, forming catalyst bodies from the mixture and thereafter reducing the catalyst bodies by contact with a reduction gas at a temperature between about 100 and 400° C.

2. Improvement according to claim 1, in which said powdered iron is admixed in amount of about 10 to 75% of the total quantity of iron present in the catalyst produced.

3. Improvement according to claim 2, in which said iron powder is admixed in amount of about 25% to 50% of the total quantity of the iron present in the catalyst produced.

4. Improvement according to claim 1, in which said iron powder has a grain size of about 40 to 80 $\mu$.

5. Improvement according to claim 1, in which said iron powder contains an activator selected from the group consisting of chromium, manganese, titanium, tungsten, alkalis, and alkaline earths.

6. Improvement according to claim 1 in which said reduction is effected at a temperature of about 200–350° C.

7. An unsintered carrier-free precipitated iron catalyst for use in catalytic carbon monoxide hydrogenation formed by precipitating an aqueous iron salt solution with an alkaline reacting compound, mechanically mixing iron powder having a grain size of about 10 to 250 $\mu$ with the wet catalyst precipitate to form a substantially uniform mixture, forming catalyst bodies from the mixture and thereafter reducing the catalyst bodies by contact with a reduction gas at a temperature between about 100 and 400° C.

References Cited in the file of this patent

UNITED STATES PATENTS

| Number | Name | Date |
|---|---|---|
| 2,164,292 | Jenness | June 27, 1939 |
| 2,211,022 | Michael | Aug. 13, 1940 |
| 2,426,929 | Kearby | Sept. 2, 1947 |
| 2,481,841 | Hemminger | Sept. 13, 1949 |
| 2,488,560 | Reitlinger | Nov. 22, 1949 |
| 2,500,331 | Voorhees | Mar. 14, 1950 |